United States Patent [19]
Cohen et al.

[11] Patent Number: 5,348,462
[45] Date of Patent: Sep. 20, 1994

[54] APPARATUS FOR REMOVING A FLASHING FROM A MANUFACTURED ARTICLE

[75] Inventors: Lewis Cohen, Don Mills; Leonel Henriques Machado, Toronto, both of Canada

[73] Assignee: Double W. Stationery Corp., Weston, Canada

[21] Appl. No.: 953,663

[22] Filed: Sep. 30, 1992

[51] Int. Cl.$^5$ .............................................. B29C 37/00
[52] U.S. Cl. .................................. 425/142; 264/161; 425/171; 425/289; 425/301; 425/806
[58] Field of Search ................ 264/161; 425/142, 164, 425/171, 289, 301, 806

[56] References Cited
U.S. PATENT DOCUMENTS

| | | | |
|---|---|---|---|
| 3,469,076 | 9/1969 | Saslawsky | 425/164 |
| 3,872,203 | 3/1975 | Yoshikawa et al. | 264/161 |
| 3,901,637 | 8/1975 | Eggert | 425/806 |
| 3,910,742 | 10/1975 | Lynn | 425/806 |
| 4,381,183 | 4/1983 | Bowers et al. | 425/806 |
| 4,548,574 | 10/1985 | Badalamenti et al. | 425/806 |
| 4,944,667 | 7/1990 | Greene | 425/806 |
| 5,202,135 | 4/1993 | Yawn | 425/806 |

*Primary Examiner*—Charles S. Bushey
*Attorney, Agent, or Firm*—Bereskin & Parr

[57] ABSTRACT

The present invention relates to the field of article manufacture and more particularly to an apparatus for removing the flashing from a manufactured article. The apparatus includes at least one gripping unit for gripping a portion of the flashing. The gripping unit is switched by a pneumatic actuator between an open and a clamping configuration. A support is provided upon which each gripping unit is movably mounted, and an indexing actuator is provided for indexing each gripping unit along the support between a rest position displaced from the support surface and a clamping position adjacent to the support surface. A control unit is provided for controlling the operation of the pneumatic actuator and the indexing actuator to effect removal of the flashing. The control unit causes each gripping unit, when in the clamping position, to switch from the open configuration to the clamping configuration to grip the flashing. Subsequently, the control unit causes each gripping unit to return from the clamping position to the rest position so that the flashing is removed from the article. The control unit then causes the gripping unit to switch to the open configuration to release the flashing. Other aspects of the invention provide proximity sensors for sensing the position of each gripping unit and a disposal track for removing the flashing to another location once it is removed from the article by the gripping unit.

12 Claims, 6 Drawing Sheets

APPARATUS FOR REMOVING A FLASHING FROM A MANUFACTURED ARTICLE

FIELD OF THE INVENTION

The present invention relates to the field of article manufacture and more particularly to an apparatus for removing the flashing from a manufactured article.

BACKGROUND OF THE INVENTION

A common manufacturing operation involves the sealing of deformable material such as plastic or vinyl sheeting. Such sealing may be accomplished through the use of a radio frequency (RF) sealing press or, more traditionally, with a heat sealing press. Typically, following the sealing process, there remains a portion of scrap material or "flashing" along the sealed edge. This flashing is preferably removed prior to delivering the article being manufactured to the next manufacturing operation.

In the manufacture of loose-leaf binders for instance, vinyl sheets are sealed about cardboard inserts to form a rigid cover for the binder. The flashing that remains following the sealing process preferably should be removed from the binder cover before the cover is delivered to its next stage of manufacture. The flashing has traditionally been removed manually by gripping an edge of the flashing and lifting it from the rigid binder. Since the seal substantially cuts through the vinyl sheeting, the flashing is weakened and easy to remove. Although a simple process, this method of removing the flashing depends upon the employment of manual labour. The efficiency of the flashing removal operation tends to be limited by the mundane nature of the task, as well as other inefficiencies associated with employing manual labour as opposed to utilizing automated technology.

It is therefore desirable that an automated apparatus be provided to perform the flashing removal operation. This apparatus should provide a simple and efficient means for removing the flashing. Preferably, the apparatus should be adaptable to be used in association with other automated technology.

SUMMARY OF INVENTION

The present invention provides an apparatus for removing the flashing from a manufactured article. There is provided a support surface for supporting the manufactured article and at least one gripping unit for gripping a portion of the flashing. The gripping unit is switchable between an open and a clamping configuration. There is also provided a switching means located on each gripping unit for switching the gripping unit between the open and clamping configurations. A support is provided upon which each gripping unit is movably mounted, and an indexing actuator is provided for indexing each gripping unit along the support between a rest position displaced from the support surface and a clamping position adjacent to the support surface. A control unit is provided for synchronizing the operation of the switching means and the indexing actuator to effect removal of the flashing. The control unit causes each gripping unit, when in the clamping position, to switch from the open configuration to the clamping configuration to grip the flashing. Subsequently, the control unit causes each gripping unit to return from the clamping position to the rest position so that the flashing is removed from the article. The control unit then causes the gripping unit to switch to the open configuration to release the flashing.

One aspect of the invention provides a plurality of proximity sensors for sensing the position of each gripping unit, where the proximity sensors are connected to the control unit. Another aspect of the invention provides a plurality of article holders for supporting the manufactured article above a table. A further aspect provides a disposal track for removing the flashing to another location once it is removed from the article by the gripping unit. A further aspect of the invention provides a cutting means for cutting the flashing during the removal operation prior to its disposal.

Filed concurrently with this application and related to this invention is the inventors' co-pending application for an apparatus for assembling vacuum-formed and multi-layered sheet articles.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention, and in which.

DESCRIPTION OF PREFERRED EMBODIMENT

One embodiment of the apparatus in accordance with the present invention is shown generally at 10 in FIGS. 1-4 and 8. The apparatus is generally pneumatically operated. To ensure compatibility, it is preferred that all pneumatic components are from a common source. In the described embodiment all components are available from the Festo Corporation.

The apparatus includes a support surface comprising a table 12 having a number of legs 14 depending therefrom. The table 12 is preferably rectangular in area and has a number of article holders 16 arranged along its top 18. The embodiment depicted in the figures shows eight article holders 16 arranged along the table top 18. This number is sufficient to hold a sealed article 26, such as a standard binder cover, having an approximate area of 24 ×11.75 inches. A greater or fewer number of article holders 16 may be provided depending upon the area of the article 26 being held.

Each article holder 16 includes a suction element 20 and pad 22. Each suction element 20 is attached by a pneumatic hose 24 to a suction device (not shown). The suction device provides sufficient suction at each suction element 20 to hold the sealed article 26 firmly in place. The inventors has found that a suction force of 24 inches Hg. is sufficient to firmly hold the standard binder cover described earlier. It is necessary to have a strong suction force to ensure that the article 26 is not pulled laterally if one of the gripping units, described below, engages the flashing 36 before the others.

Figure 10:
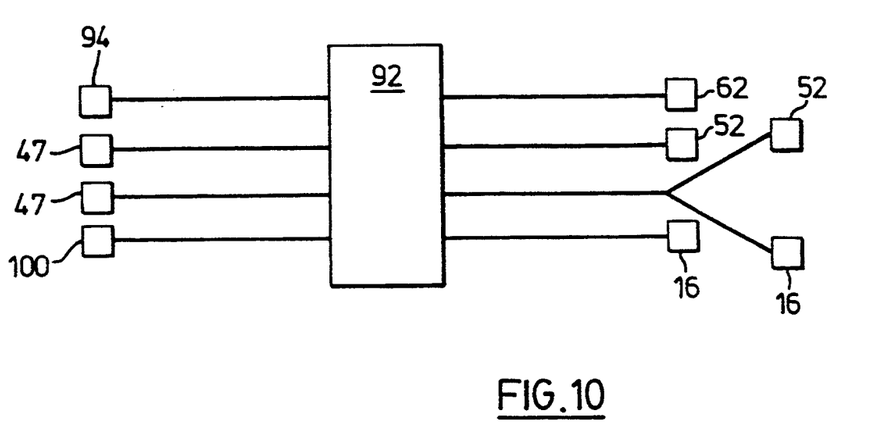
FIG. 10 is a schematic diagram of the operation of the control unit in accordance with the present invention.

The suction force provided by the suction device is capable of being disconnected intermittently to enable the sealed article 26 to be removed from the table 12. Pneumatic sensors shown schematically at 94 in FIG. 10 are located at each suction element 20 to identify a variance in the sub-atmospheric pressure when the article is being held by the article holders 16. This information is relayed to a control unit shown schematically at 92 in FIG. 10. The operation of the control unit 92 is described further below.

Figure 2:
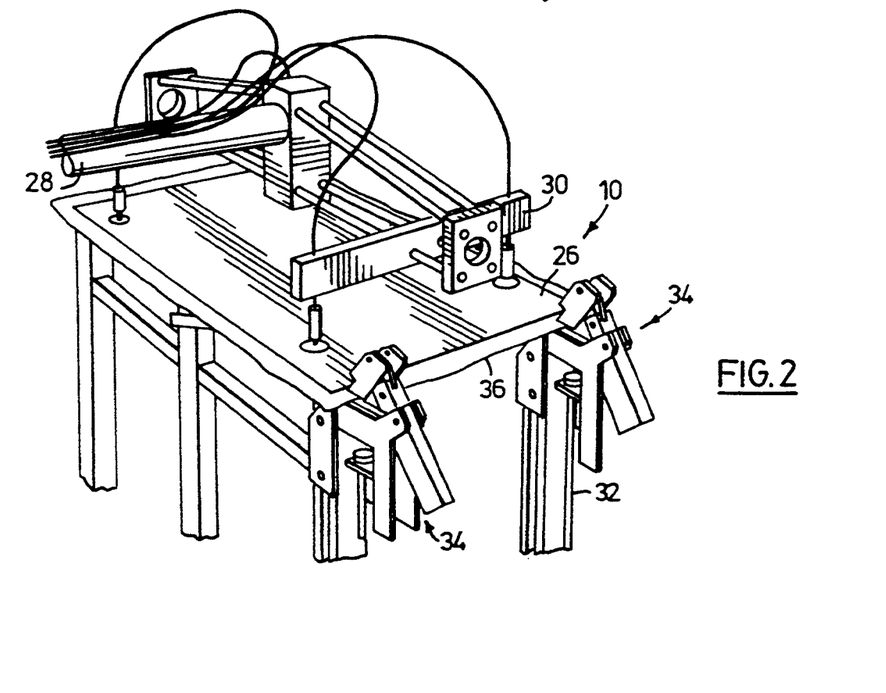
FIG. 2 is a perspective view of the apparatus in accordance with the present invention showing a manufactured article placed upon the table and showing the gripping units in a clamping position and a clamping configuration.
Figure 3:
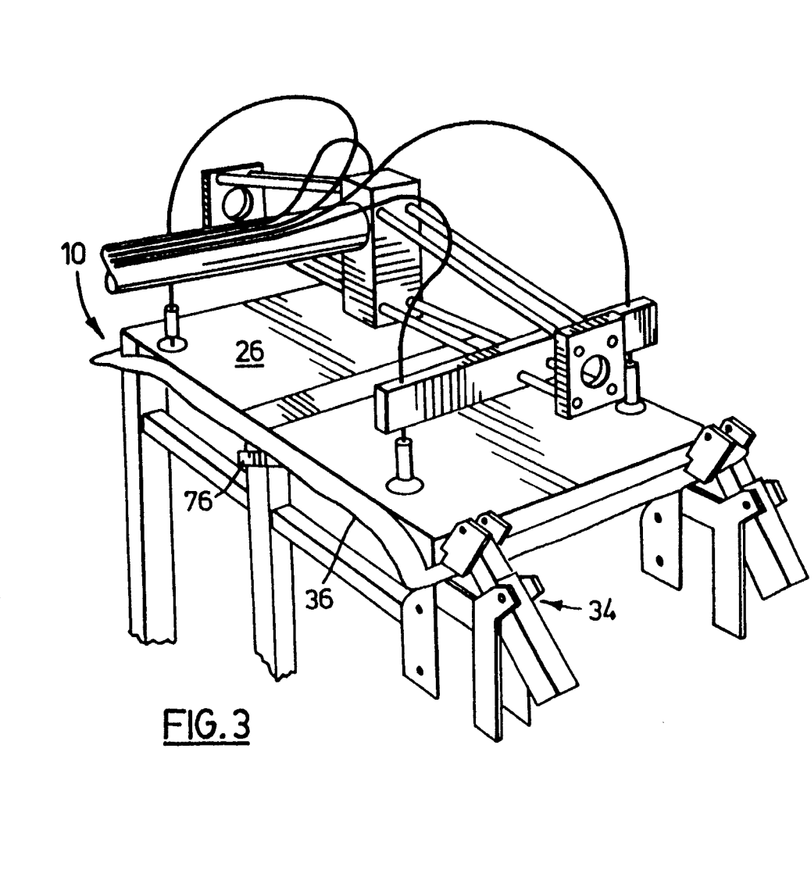
FIG. 3 is a perspective view of the apparatus in accordance with the present invention showing the gripping units gripping a portion of the flashing and being indexed from a clamping position to a rest position.

The sealed article 26 may be delivered to, and removed from, the table 12 by a carriage arm 28 having a pneumatic handling unit 30 such as the type shown in FIG. 2 and described in the inventors' related application identified earlier. The relative location of the carriage arm 28 may be sensed by a proximity sensor 100 and this information may be relayed to the control unit 92 described further below. Alternative methods of delivering the sealed article 26 to the table 12 may include a conveyor means that drops the article 26 in a desired location. Whatever delivery method is used, it is important to ensure that the article 26 is properly aligned upon the table 12 as shown in FIG. 2 to allow the flashing 36 to be properly gripped and removed.

Gripping units 34 are provided for gripping the flashing 36 at desired intervals about the perimeter of the sealed article 26. The gripping units 34 are each indexed along a support 32 by an indexing actuator 38.

While the supports 32 may serve as legs 14 to support the table 12, it is preferable that they be connected to a sub-frame (not shown), with adjustable frame members (not shown) to allow the supports to be adjusted relative to each other to accommodate different sized articles 26. The sub-frame in turn may be surrounded by an apparatus enclosure (not shown). Such an enclosure is desirable to act as a safety guard to prevent accidental contact between an operator and the moving parts of the apparatus.

Figure 5:
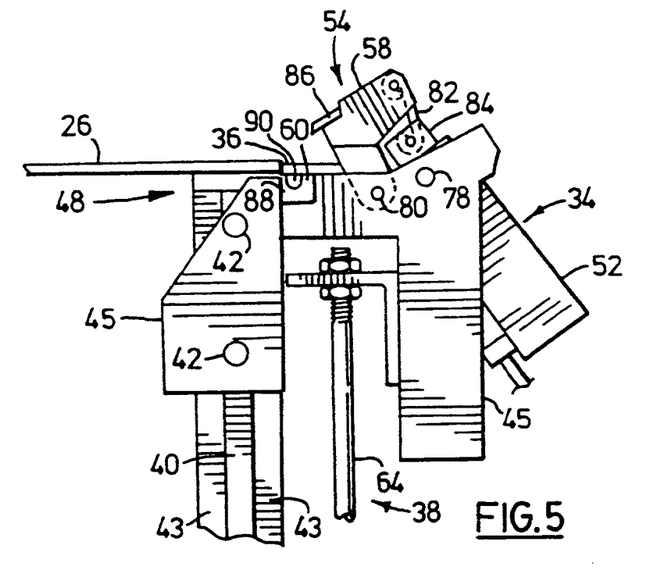
FIG. 5 is side view of one of the gripping units showing the gripping unit in an open configuration.

As best shown in FIG. 5, each support 32 has a track 40 along which runners 42 travel. The track 40 and runners 42 preferred by the inventors are THK (trademark) linear bearings. The runners 42 are attached to a bracket 45 that supports the gripping unit 34. The track 40 includes flanges 43 that ensure that the runners 42 remain within the track. The tracks 40 are mounted on the inner faces of the supports 32.

Figure 6:
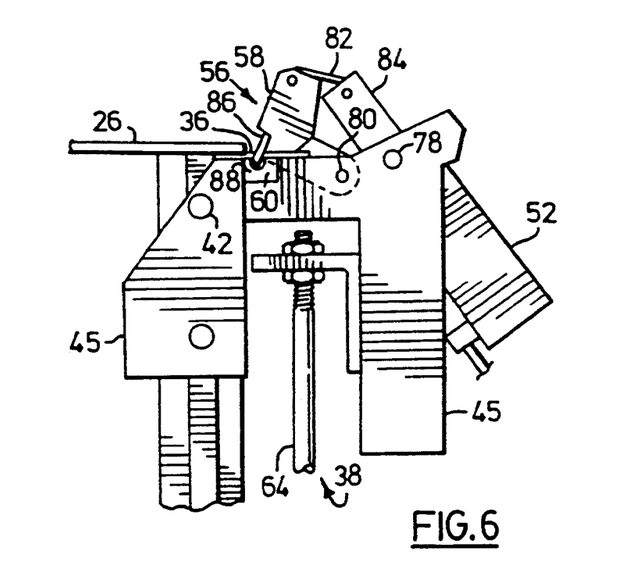
FIG. 6 is a side view of one of the gripping units showing the gripping unit in a clamping configuration.

The track 40 has upper and lower ends 48 and 50. At the upper end 48, the gripping units 34 are switched by a pneumatic actuator or switching means 52 from an open configuration to a clamping configuration as shown in FIGS. 5 and 6. Each pneumatic actuator 52 is a pneumatic piston and cylinder unit. At the lower end 50 the gripping units 34 are switched by the pneumatic actuator 52 from a clamping configuration to an open configuration. The gripping units 34 are thus at a rest position at the lower end 50 and a clamping position at the upper end 48. Inductive proximity sensors 47 are provided at the upper and lower ends 48, 50 to identify the location of each gripping unit. This information is relayed to the control unit 92 which, in turn, commands the switching means 52 to switch configurations. The operation of the control unit 92 is described below.

The gripping units 34 of the present invention are in the form of pneumatic clamps such as are known to those skilled in the art. They are best shown in FIGS. 5 and 6 where they are respectively indicated in their opened and closed configurations.

Each gripping unit 34 shown in FIGS. 5 and 6 has a pivotable upper jaw 58 and a fixed lower jaw 60 secured to the bracket 45. Clearly, a variety of gripping units 34 may be used with the present invention, pneumatic or otherwise.

The pneumatic actuator 52 switches the jaws 58, 60 of the gripping units 34 between the open configuration as shown in FIG. 5 and the closed configuration as shown in FIG. 6. The pneumatic actuator 52 has a body or cylinder mounted to the bracket 45 at 78. The upper jaw 58 is pivotally mounted to the lower jaw 60 at 80 and a link 82 is pivotally connected to both the upper jaw 58 and a piston 84 of the pneumatic cylinder 52. The pneumatic cylinder 52, which is double acting, is controlled to switch the jaws 58, 60 between an open and clamping configuration according to the position of the gripping units 34 along the track 40.

The upper jaw 58 has an edge plate 86 that is angled at its end to squarely meet with a lower face plate 88 located upon the lower jaw 60 when the gripping unit is in a clamping configuration. The jaws 58 and 60 may be formed of plastic and the plates 86 and 88 may be made from any durable material such as hardened steel. The lower face plate 88 includes a recessed channel portion 90 into which the free end of the edge plate 86 fits when the gripping unit is in a clamped configuration. Alternatively, the lower face plate 88 may have a serrated surface to aid gripping of the flashing. When the jaws 58, 60 are in a clamping configuration, the plates 86, 88 will thus firmly grip the flashing 36.

Figure 7:
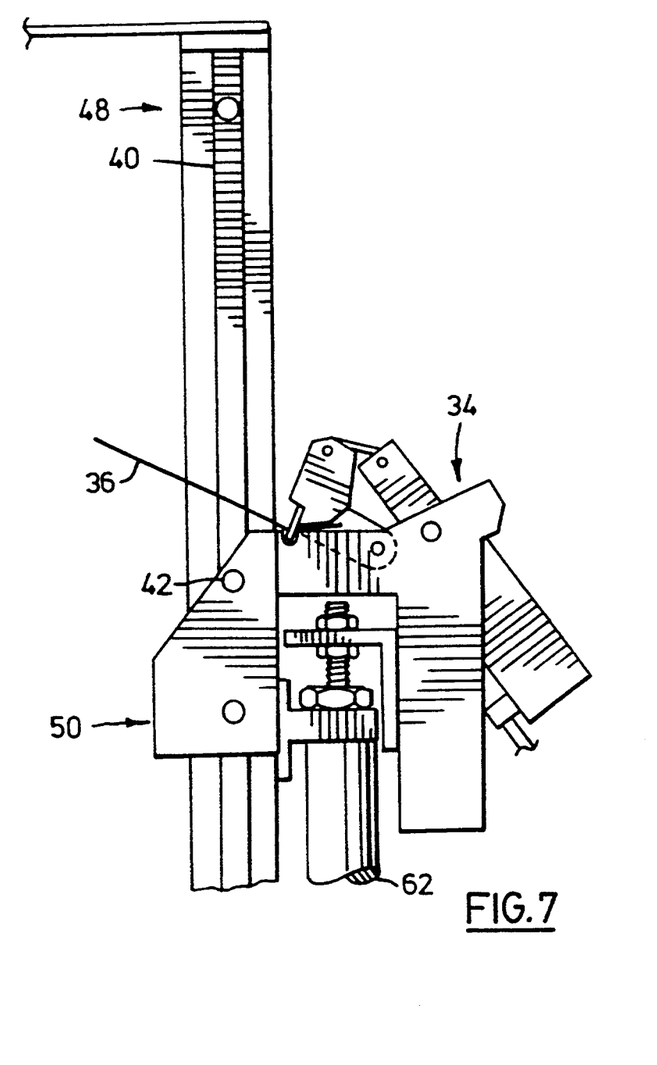
FIG. 7 is a side view of a gripping unit showing the gripping unit in a rest position and a clamping configuration

The gripping units 34 are indexed along the support 32 by the indexing actuators 38, each comprising a further double acting pneumatic cylinder 62. FIG. 7 shows the cylinder 62 from which an indexing arm 64 extends. The pneumatic cylinder 62 thus indexes the gripping units 34 between the rest position and the clamping position.

The movement and operation of the indexing actuators or pneumatic cylinders 62, the switching means or pneumatic actuators 52, and the article holders 16, is all controlled by the control unit 92 shown schematically in FIG. 10. The control unit 92 preferably uses a programmable logic control (PLC) to synchronize the operations. PLC's are known in the industry and will not be described in detail herein. The PLC used by the inventors is the FESTO 101AF (trade-mark) sold by the Festo Corporation. This control unit controls the operations described in the present embodiment as well as the operations described in the inventors' co-pending application identified earlier.

Input information is fed to the PLC from the proximity sensors 47 located along the track 40 at the end of the stroke of the cylinder 62, as well as from the pneumatic sensors 94 located at each suction element 20, and from proximity sensors 100 located on the carriage arm 28. The PLC gathers the input information and, upon receiving a preselected group of inputs, will relay a set of commands (output) to the pneumatic cylinders 62, pneumatic actuators 52 and article holders 16.

Figure 1:
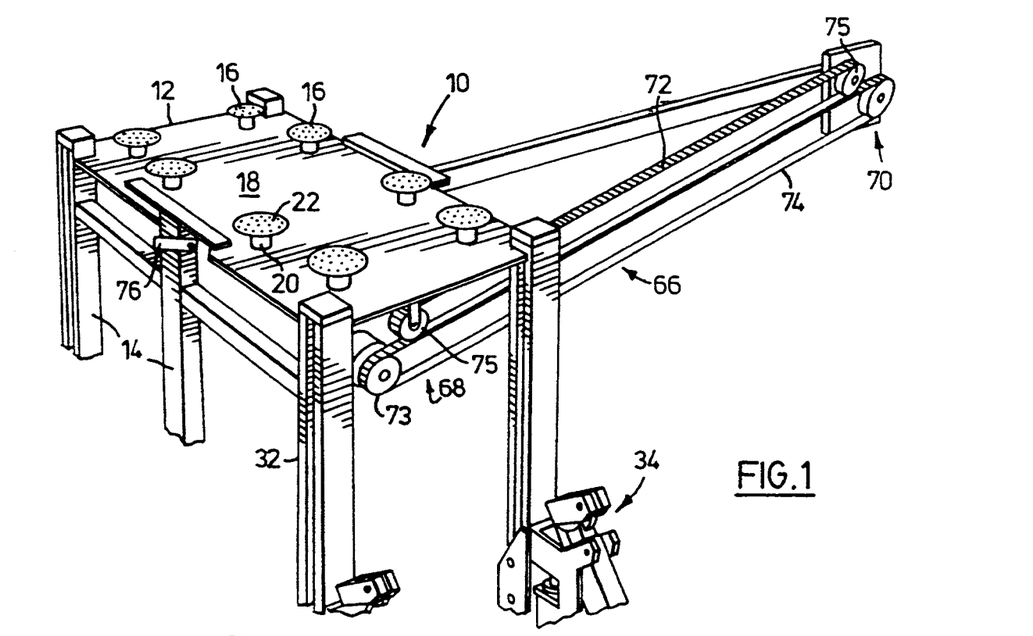
FIG. 1 is a perspective view of the apparatus in accordance with the present invention, showing the gripping units in a rest position and an open configuration.
Figures 8, 9:
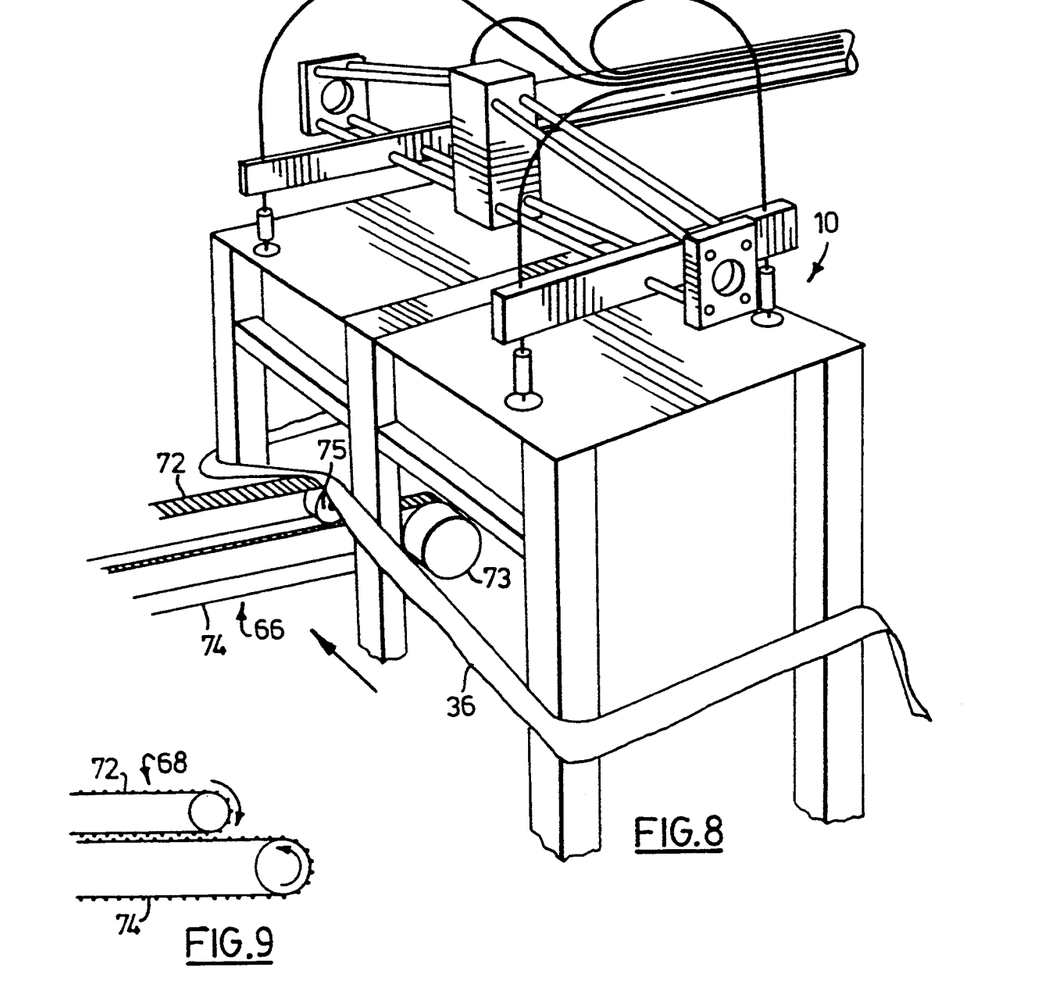
FIG. 8 is a reverse perspective view of the apparatus as shown in FIG. 1, showing a disposal track removing the flashing.
FIG. 9 is a partial side view of a first end of the disposal track showing the directions of track movement.

FIGS. 1, 8 and 9 show a disposal track arrangement 66 that gathers the flashing 36 once it has been removed from the article 26 and released by the gripping units 34. The disposal track 66 has first and second ends 68, 70. The first end 68 is located adjacent to the table 12 at a position generally level with the rest position of the gripping units 34. A second end 70 of the disposal track 66 is located a distance from the table 12 as may best be seen in FIG. 1.

The disposal track 66 has first and second rotatable belts 72, 74 although alternative gripping means are conceivable. The first rotatable belt 72 is located above the second belt 74 relative to the table 12. As may be seen in FIG. 9, the first belt 72 is shorter than the second belt 74. The two belts 72, 74 rotate in opposite directions with the first belt 72 rotating in a clockwise direction as shown in FIG. 9. The rotatable belts are driven by an electric motor 73 connected to one end of the second belt 74, with the first belt 72 and the other end of the second belt 74 consequently being mounted on idlers 75.

The belts 72, 74 preferably are toothed so that the flashing 36 may be gripped and pulled between the belts. Timing belts are suitable for this purpose. The belts 72, 74 are arranged with their teeth outwards to grip the flashing. This also ensures that one belt drives the other. The opposing rotation of the belts 72, 74 allows the flashing 36 to be directed from the first track end 68 to the second track end 70. At the second end 70, the flashing 36 will be released and deposited into a receptacle (not shown).

Figure 4:
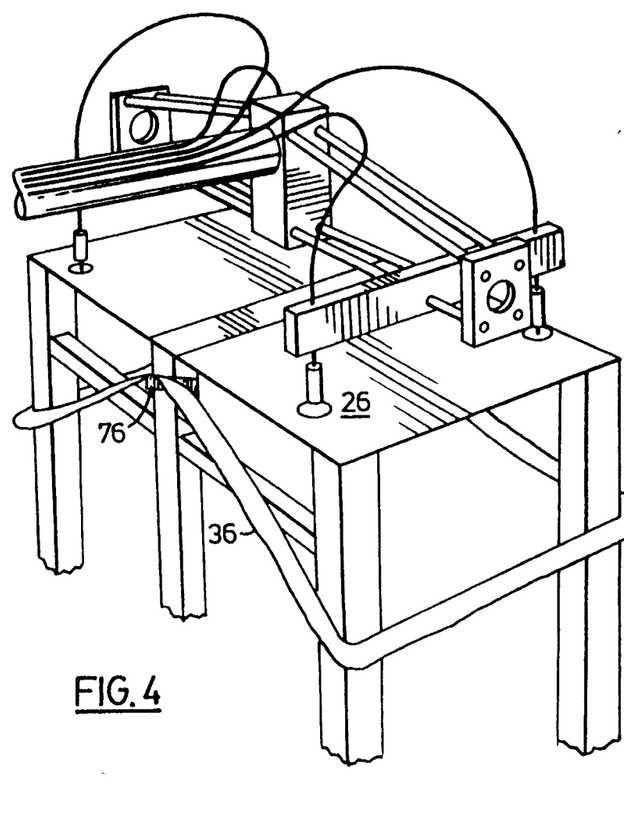
FIG. 4 is a perspective view of the apparatus in accordance with the present invention showing the flashing having been removed from the manufactured article.

As shown clearly in FIG. 4, a cutting blade 76 is provided at a position slightly below the table 12. The cutting blade 76 may be any suitable sharp object, such as a razor blade. When the flashing 36 has been gripped and removed from the article 26, the cutting blade 76 cuts one side of the flashing 36 so that it may be removed by the disposal track 66. The cutting blade 76 is located along the side of the table 12 opposite the disposal track 66.

The operation of the apparatus is described below and shown schematically in FIG. 10. In use, gripping units 34 would commence at the rest position shown in FIG. 1. A ring binder cover 26 with flashing 36 would then be swung over the article holders 16, as shown in FIG. 2, by means of the carriage arm 28. The carriage arm 28 would be lowered, and suction to the pneumatic handling units 30 of that arm 28 would then be released, permitting the article 26 to rest on the article holders 16. Simultaneously, suction is applied to the article holders 16, to hold the article 26 in position. The pneumatic sensors 94 would sense when the ring binder cover is being held by the article holders 16 and relay this information to the control unit 92.

The control unit 92 would then cause the pneumatic cylinders 62 to be actuated to drive the gripping units 34 upwards to the clamping position adjacent the article 26. When the gripping units reach the clamping position their location is sensed by the proximity sensors 47 and this information is relayed to the control unit 92. The control unit 92 would then cause the pneumatic actuators 52 to be operated to cause the jaws 58, 60 to grip the flashing 36 around the binder cover 26.

Closure of the jaws 58, 60 can either be sensed by suitable proximity sensors, or simply by allowing suitable time for the jaws to close. The pneumatic cylinders 62 are then operated to drive the gripping units 34 downwards, pulling the flashing 36 with them. As the flashing passes over the blade 76 it is cut.

When the gripping units 34 reach their lower or rest position their location is sensed by the proximity sensors 47 and this information is relayed to the control unit 92. The control unit 92 would then cause the pneumatic actuators 52 to release the flashing 36. Simultaneously, the flashing would come into contact with the belts 72, 74, and be drawn between them. Further movement of the belts draws the flashing away to a receptacle. The receptacle can be dimensioned to hold a suitable quantity of scrap flashing and can be periodically emptied.

When the flashing 36 has been removed from the binder cover 26 and the gripping units 34 are sensed to be in their rest position, the control unit 92 would cause the suction applied to the article holders 16 to be released and the finished binder cover 26 would be removed from the table 12 by the carriage arm 28. The arrival of another binder cover 26 with flashing 36 to the table 12 would be sensed by a suitable proximity sensor 100 located upon the carriage arm 28 and this information would be relayed to the control unit 92. The control unit 92 would cause the suction to be reapplied to the article holders 16 and the sequence outlined above would be initiated again.

It is to be understood that what has been described are preferred embodiments of the invention. The invention nonetheless is susceptible to certain changes and alternative embodiments are fully comprehended by the spirit of the invention as described above and the scope of the claims as set below.

I claim:

1. An apparatus for removing a flashing from a manufactured article, said apparatus comprising:
   (a) a support surface for supporting said manufactured article;
   (b) at least one gripping unit for gripping a portion of said flashing, said gripping unit being switchable between an open configuration and a clamping configuration;
   (c) a switching means located upon said gripping unit for switching said gripping unit between said open and clamping configurations;
   (d) a support on which each gripping unit is movably mounted;
   (e) an indexing actuator for indexing each gripping unit relative to said support between a rest position displaced from said support surface, and a clamping position adjacent said support surface;
   (f) a control unit for controlling the operation of said switching means and said indexing actuator to effect removal of the flashing, the control unit causing each gripping unit, when in the clamping position, to switch from the open configuration to the clamping configuration to grip the flashing, and to return from said clamping position to said rest position so that the flashing is removed from said article, said gripping unit subsequently being switched to said open configuration to release said flashing; and (g) a plurality of proximity sensors located adjacent said support for sensing the position of said gripping unit, said proximity sensors being electrically connected to said control unit.

2. An apparatus as claimed in claim 1, wherein said support surface comprises a table and includes a plurality of article holders located on said table to hold the manufactured article.

3. An apparatus as claimed in claim 2, which includes a plurality of said gripping units and a support for each gripping unit, wherein each said support includes a track along which said gripping unit may travel, and each gripping unit includes a bearing means that travels along said track.

4. An apparatus as claimed in claim 3, wherein said indexing actuator comprises, for each gripping unit, a pneumatic cylinder unit connected between the respective support and the respective gripping unit.

5. An apparatus as claimed in claim 4, wherein each gripping unit has an upper jaw pivotably connected to a lower jaw to allow said gripping unit to be switched between said open configuration and said clamping configuration by said switching means to clamp the flashing between said upper and lower jaws.

6. An apparatus as claimed in claim 5, wherein said switching means includes a pneumatic cylinder unit attached to said upper and lower jaws.

7. An apparatus as claimed in claim 6, wherein said pneumatic cylinder unit comprises a cylinder secured to said lower jaw and a piston, and wherein a connecting link is pivotably connected between said piston and said upper jaw.

8. An apparatus as claimed in claim 7, wherein said article holders have suction elements to releasably hold said manufactured article, said suction elements being connected to a suction device by a pneumatic hose.

9. An apparatus as claimed in claim 8, wherein said suction elements include a pneumatic sensor for sensing the presence of the manufactured article by the subatmospheric pressure developed at the suction elements, said pneumatic sensors being electrically connected to said control unit.

10. An apparatus as claimed in claim 2 or 9, further comprising a disposal track for removing said flashing to another location once said flashing has been removed from said article and released by said gripping units.

11. An apparatus as claimed in claim 10, further comprising a cutting means for cutting said flashing during the removal operation prior to its disposal by said disposal track.

12. An apparatus as claimed in claim 11, wherein said disposal track has first and second ends, said first end being located adjacent to said table and said second end being a distance from said table, and wherein said disposal track has first and second rotatable belts, said first belt rotating in an opposite direction to said second belt, and said first belt being adjacent to and above said second belt relative to said table such that said flashing is drawn between said first and second belts at said first end of said disposal track and deposited at said second end of said disposal track.

* * * * *